United States Patent
Hsu (10) Patent No.: US 6,453,140 B1
(45) Date of Patent: Sep. 17, 2002

(54) VIBRATION INHIBITING MECHANISM FOR SCANNER

(75) Inventor: Ting-Jar Hsu, Tainan (TW)

(73) Assignee: Umax Data Systems, Inc. (TW)

( * ) Notice: Subject to any disclaimer, the term of this patent is extended or adjusted under 35 U.S.C. 154(b) by 0 days.

(21) Appl. No.: 09/645,293

(22) Filed: Aug. 24, 2000

(30) Foreign Application Priority Data

Aug. 27, 1999 (TW) ....................................... 88214618 U (51) Int. Cl.⁷ ..................... G03G 15/04; G03G 15/28; G03G 15/30
(52) U.S. Cl. ..................... 399/210; 267/136; 267/174; 267/158
(58) Field of Search ................................ 267/136, 249, 267/174, 158, 243; 399/210, 177; 347/129

(56) References Cited

U.S. PATENT DOCUMENTS

| | | | | |
|---|---|---|---|---|
| 3,918,806 A | * | 11/1975 | Cook | 355/8 |
| 4,332,460 A | * | 6/1982 | Costanza | 355/8 |
| 4,448,514 A | * | 5/1984 | Fujii et al. | 355/8 |
| 4,496,130 A | * | 1/1985 | Toyama | 248/585 |
| 4,857,956 A | * | 8/1989 | Honda | 355/234 |
| 4,862,218 A | * | 8/1989 | Tsunoda et al. | 355/235 |
| 4,982,236 A | * | 1/1991 | Bock | 355/235 |
| 5,001,808 A | * | 3/1991 | Chung | 16/18 CG |
| 5,743,516 A | * | 4/1998 | Lindner et al. | 267/30 |
| 5,811,743 A | * | 9/1998 | Kohara et al. | 187/393 |
| 6,068,250 A | * | 5/2000 | Hawkins et al. | 267/162 |

FOREIGN PATENT DOCUMENTS

| | | |
|---|---|---|
| DE | 0-864-869 A1 * | 9/1998 |
| JP | 361226738 A * | 10/1986 |

* cited by examiner

Primary Examiner—Jack Lavinder
Assistant Examiner—Xuan Lan Nguyen
(74) Attorney, Agent, or Firm—Morland C. Fischer (57) ABSTRACT

A vibration inhibiting mechanism for a scanner including a base installed in a chassis of the scanner for resiliently biasing a roller support formed with a roller assembling portion on the top thereof; a roller being mounted on the roller assembling portion for abutting against a glass panel disposed on a top side of casing for receiving the chassis by an upward urging force exerted by the roller support, so as to prevent the chassis from vibrating along a direction perpendicular to the glass panel during the movement of the chassis and to prevent damage to or dislocation of the chassis during a drop test.

8 Claims, 8 Drawing Sheets

VIBRATION INHIBITING MECHANISM FOR SCANNER

FIELD OF THE INVENTION

The present invention relates to mechanisms for a scanner and, more particularly, to a vibration inhibiting mechanism for a scanner that limits the movement of a chassis containing an image detecting device in the scanner along a Z direction.

BACKGROUND OF THE INVENTION

Figure 1:
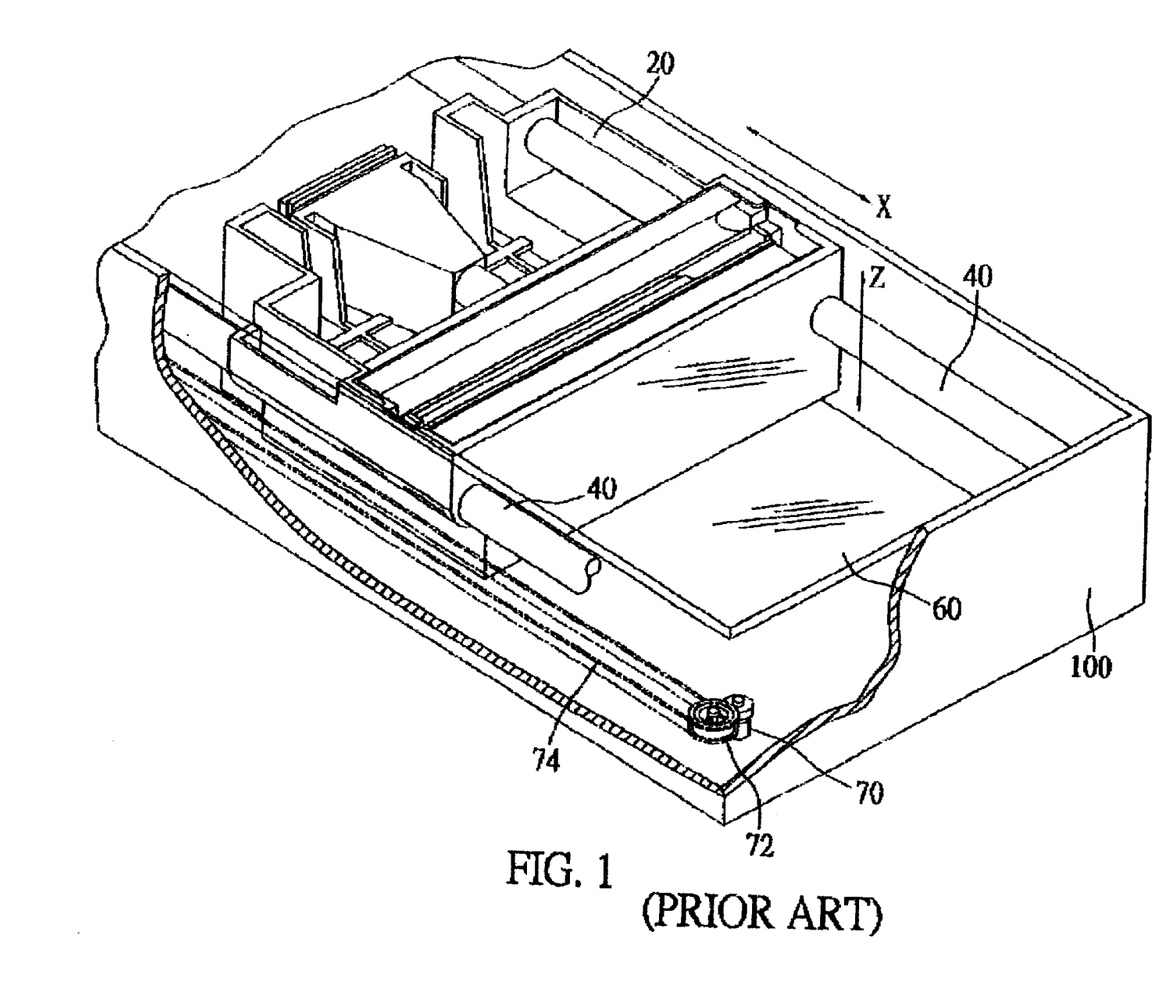
FIG. 1 is a schematic perspective view of the main parts of a prior at scanner having two slide levers.

FIG. 1 illustrates a simplified schematic diagram of a conventional scanner, the scanner of this type includes a casing 100 with a glass panel 60 fitted on its top, and a chassis 20 mounted therein. The chassis 20 is slidably coupled with a pair of parallel aligned slide levers 40 disposed in the casing for a driving mechanism (to be described below) to drive the chassis 20 to slidably move along the extending direction (designated with X direction in the drawing) of the slide levers 40. In the chassis 20, an image scanning mechanism (not shown) is mounted for scanning the document positioned over the glass panel 60. The aforementioned image scanning mechanism in general includes a change-coupled device, a set of reflecting mirrors, a light-emitting source, and a signal conversion device. As shown in FIG. 1, the driving mechanism in the chassis 20 consists of a servo motor 70, a pulley 72 driven by the servo motor 70, and a driving belt 74 winding around the pulley 72. Since the driving belt 74 is connected to one side of the chassis 20, the rotation of the pulley 72 driven by the servo motor 70 will drive the driving belt 74 to move to thereby cause the chassis 20 to move along the X direction of the casing 100.

As shown in FIG. 1, the chassis 20 is held in position by the slide levers 40, which confines the chassis 20 to slidably move horizontally with respect to the casing 100, that is, in the X direction, and assures that the chassis 20 will not move vertically with respect to the casing 100, that is, in the Z direction, whereby scanning quality can be maintained. However, because the chassis 20 is made of a metallic material which requires delicate surface treatment, the manufacturing of the slide levers 40 has the drawback of high production cost.

Figure 2:
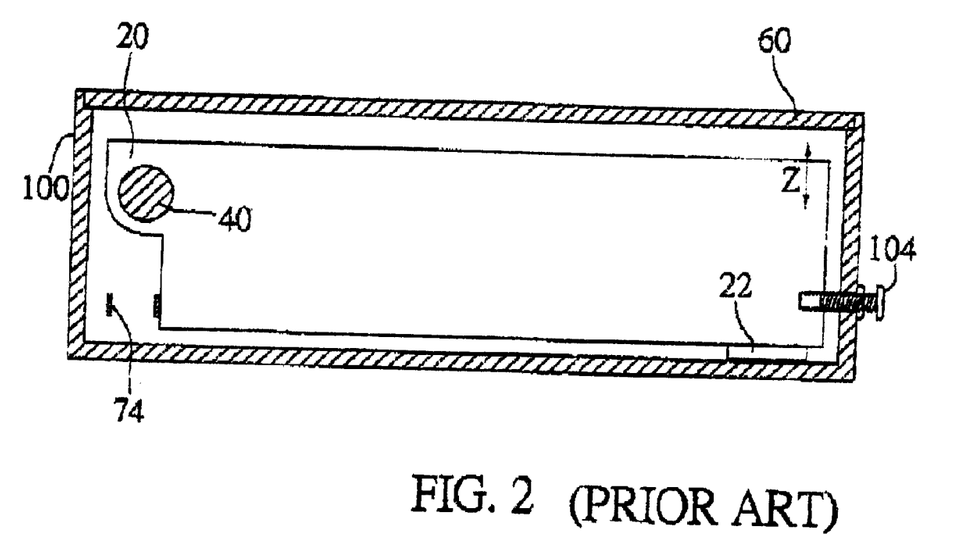
FIG. 2 is a schematic sectional view of the main parts of another prior art scanner having a single slide lever.

FIG. 2 illustrates a sectional view of another conventional scanner in which the chassis 20 has one side fitted onto a slide lever 40 inside the casing 100 and is driven by a belt 74, while on the other side of the chassis 20 a roller (or a round smooth jut) 22 that can roll (or slides) on the inner surface of the casing 100, is mounted. Though this type of scanner that uses only one slide lever 40 could be lower in production cost than the prior art as aforementioned, one side of the chassis 20 which is adapted to rest on the inner of the casing 100 is not subject to any restriction along the Z direction of the chassis 20. Therefore, vibration of the chassis 20 occurs when the chassis 20 is one sidedly driven by the pulley 74 during the operation of the scanner, or when the inner surface of the casing 100 is not sufficiently smooth, resulting in unsatisfactory scanning quality.

Since the chassis 20 is not restricted in movement along the Z direction, it can be easily damaged or dislocated when the scanner is subjected to a drop test. The aforementioned scanner with a single slide lever 40 thus requires a retainer 104, as shown in FIG. 2, to limit the movement of the chassis 20 along the Z direction. However, the retainer 104 which is mounted to prevent the chassis 20 from being damaged or dislocated during a drop test or transportation must be removed before the scanner is used, so as to prevent vibration of the chassis 20 along the z direction when the scanner is in operation.

SUMMARY OF THE INVENTION

It is therefore a primary objective of the present invention to provide a vibration inhibiting mechanism for scanner that can limit the movement of the chassis equipped with an image detecting device in a scanner in order to reduce the production cost and vibration when the chassis is in operation.

Another objective of the invention is to provide a vibration inhibiting mechanism for scanner that can prevent damage or dislocation to the chassis in a scanner during drop test or transportation process without the need of a retainer.

To achieve the above and other objectives, the present invention provides a vibration inhibiting mechanism for scanner having a casing with a glass panel formed on the top side thereof and a chassis movably installed in the casing for allowing an image detecting device coupled to the chassis to scan document positioned on the glass panel, in which the vibration inhibiting mechanism comprises a base mounted in the chassis, a roller support resiliently sleeved in the base toward and being adapted to retractably move toward and away from the glass panel, and a roller rotatably mounted on the roll assembling portion of the roller support and adapted to abut against and roll on the glass panel when the chassis is driven to move.

The roller support can be resiliently supported by a resilient member, for example, a coiled spring or a spring plate, to allow the roller support to retractably move toward and away from the glass panel. By the use of the resilient member, the roller can constantly abut against the glass panel by the upward urging force exerted by the roller support to thereby keep the chassis from vibration during the movement of the chassis.

Furthermore, the base is preferably a round or rectangular cylindrical body. The base can be axially formed with a pair of grooves on the top of the base. When the roller support and the resilient member are accommodated in the base, a pair of corresponding protrusions laterally protruded from the outer wall of the roller support are to be engaged with the grooves so as to prevent the roller support from rotation in relation to the base. In this case, the top of the roller support is formed with a pair of upwardly protruded flanges for coupling with the roller to allow the roller to rotate therebetween. member are accommodated in the base, a pair of corresponding protrusions laterally protruded from the outer wall of the roller support are to be engaged with the grooves so as to prevent the roller support from rotation in relation to the base. In this case, the top of the roller support is formed with a pair of upwardly protruded flanges for coupling with the roller to allow the roller to rotate therebetween.

Furthermore, the base may also be a round recess or a rectangular recess formed on the chassis to respectively accommodate the roller support and the resilient member.

DETAILED DESCRIPTION OF PREFERRED EMBODIMENT

Figure 3:
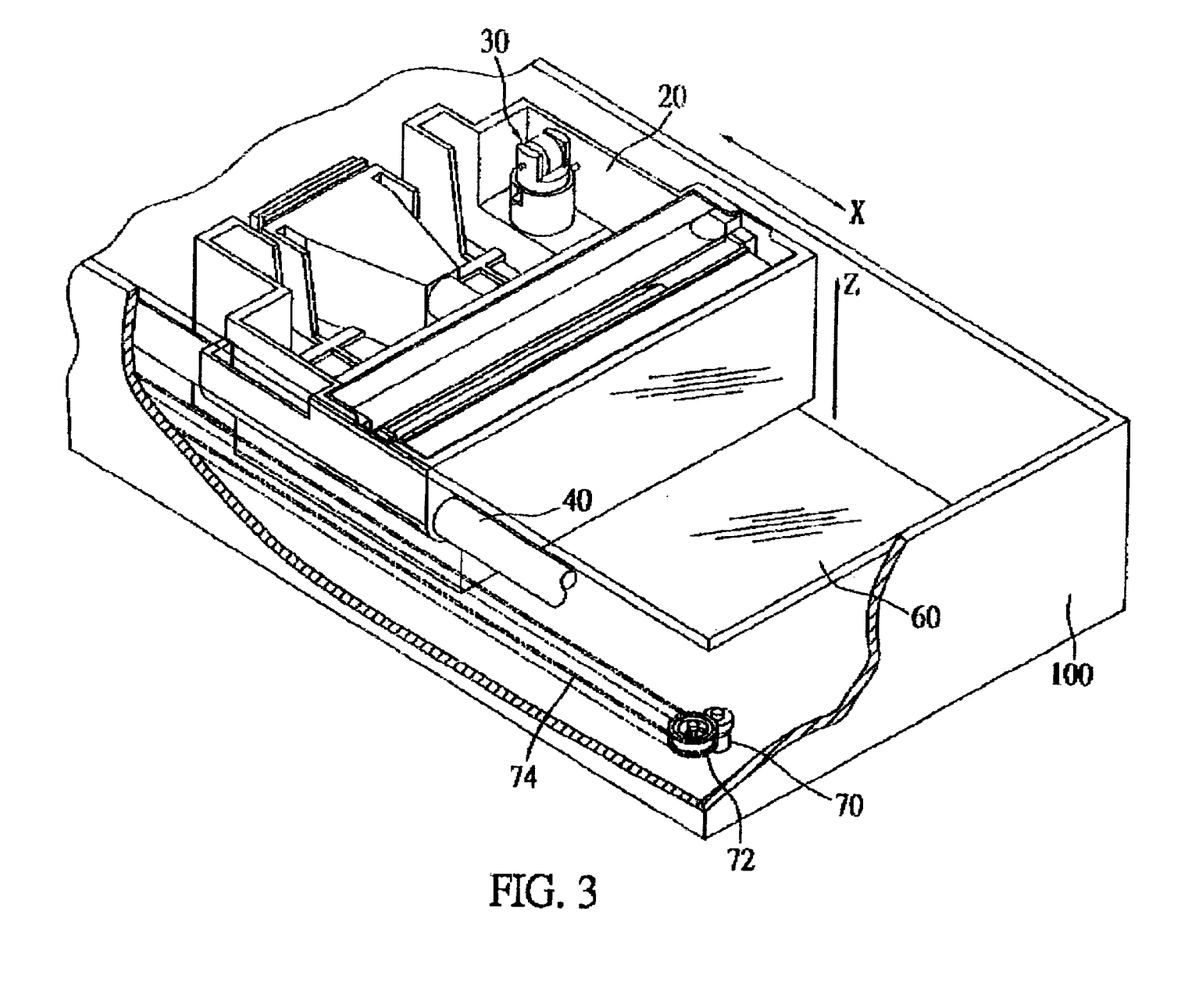
FIG. 3 is a schematic perspective view of the scanner equipped with the vibration inhibiting mechanism of the first embodiment of the present invention.

FIG. 3 shows a scanner equipped with the vibration inhibiting mechanism 30 of the first embodiment of the present invention. Components of the vibration inhibiting mechanism 30 which are identical to those illustrated in FIGS. 1 and 2 are herein labeled with the same numeral references and detailed descriptions thereto are omitted. As shown in the drawing, the vibration inhibiting mechanism 30 is located on one side of a chassis 20 positioned beneath a glass panel 60 disposed on the top side of the casing 100, opposite to the side where a slide lever 40 is located.

Figure 4:
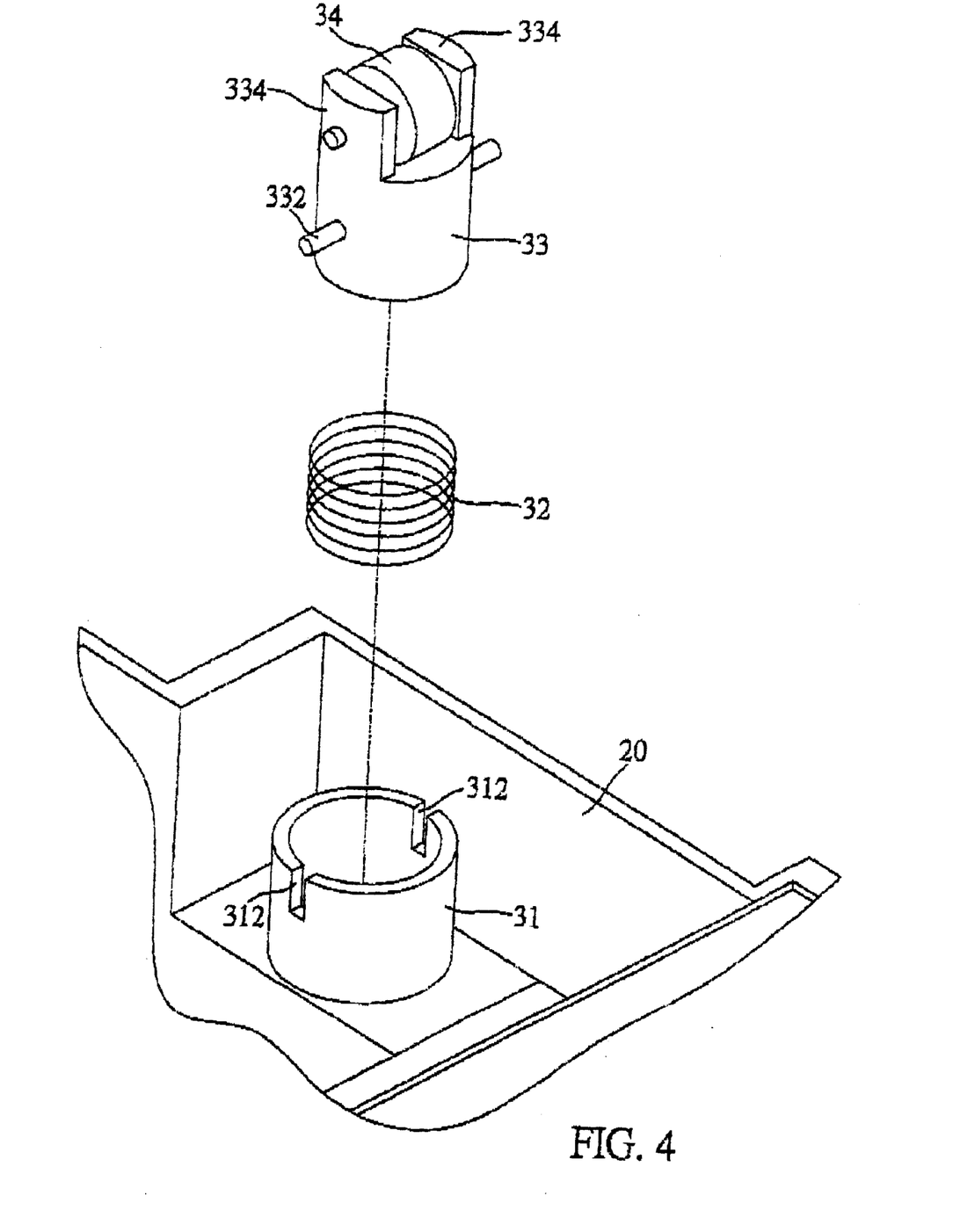
FIG. 4 is an exploded view of the vibration inhibiting mechanist embodiment of the first embodiment of the present invention.

Referring now to FIG. 4 the vibration inhibiting mechanism 30 includes a cylindrical base 31, a spring 32, a roller support 33 and a roller 34. As shown in the drawing, the cylindrical base 31 is of a round shape and on the top of its ring-shaped cylinder well a pair of axially disposed grooves 312 are formed. Inside the cylindrical base 31 a spring 32 is received, then the roller support 33 is removably sleeved in the cylindrical base 31 for coupling with the spring 32. A pair of protrusions 332 are laterally protruded from the outer wall of the roller support 33 for engaging with the grooves 312, thereby movement of the protrusions 332 is limited by the grooves 312 when the roller support 33 retractably moves up and down in relation to the vertical axis (not shown) of the cylindrical base 31. Therefore, the roller support 33 can be prevented from rotating in relation to the cylindrical base 31. And, on the top side of the roller support 33 a pair of axially disposed flanges 334 are formed to allow the roller 34 to couple thereto.

Figure 5:
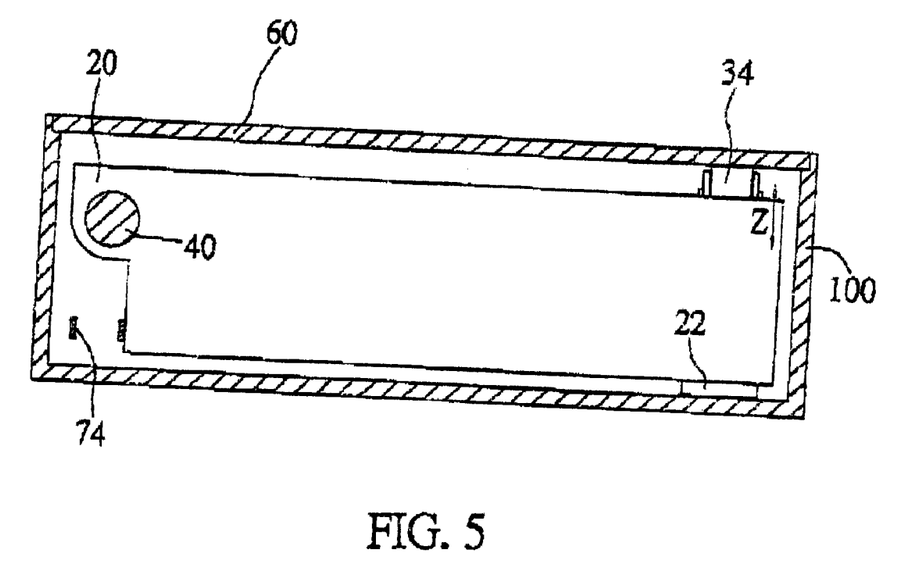
FIG. 5 is a sectional view of the scanner equipped with the vibration inhibiting mechanism of the first embodiment of the present invention.

As shown in FIG. 5, when the glass panel 60 is fixed onto the top side of the casing 100, the roller 34 is slightly depressed to downwardly push the roller support 33 into the cylindrical bas 31 in response to the elasticity of the spring 32 inside the cylindrical base 31. The spring 32 provides the roller support 33 with an upward urging force to make the roller 34 rolls in abutment with the bottom side of the glass 60. As the roller (or a round jut) 22 can move smoothly on the glass panel 60 and the spring 32 provides a cushion effect to the chassis 20, the chassis 20 can be prevented from being movable along the z direction of the casing 100. The vibration of the chassis 20 during its movement can thus be eliminated to ensure scanning quality.

Figure 6:
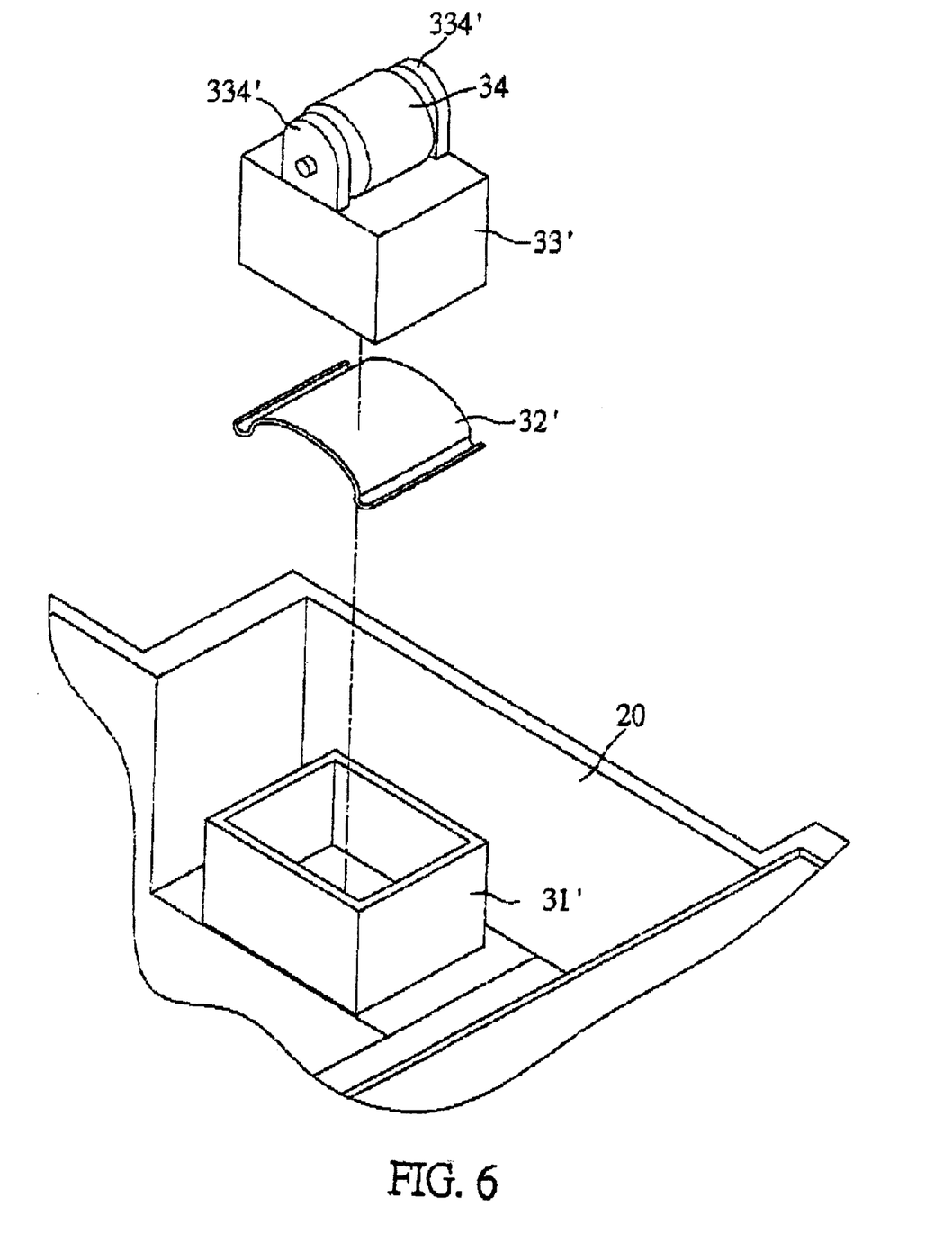
FIG. 6 is an exploded view of the vibration inhibiting mechanism of another embodiment of the present invention.

FIG. 6 is an exploded view of another embodiment of the vibration inhibiting mechanism of the invention showing that the cylindrical base 31' is of a rectangular shape to in turn accommodate a spring plate 32' and the roller support 33'. On the top of the roller support 33' a pair of opposing flanges 334' are formed for the roller 34' to be coupled thereto. In FIG. 6, since the cylindrical base 31' ad the roller support 33' are of rectangular shapes, the roller support 33' will not rotate in relation to the cylindrical base 31'. In other words, the roller 34 will always roll in the direction where the chassis is moving, therefore, there is no need to from grooves on the base 31' and protrusions on the roller support 33' as illustrated in FIG. 5.

Figure 7:
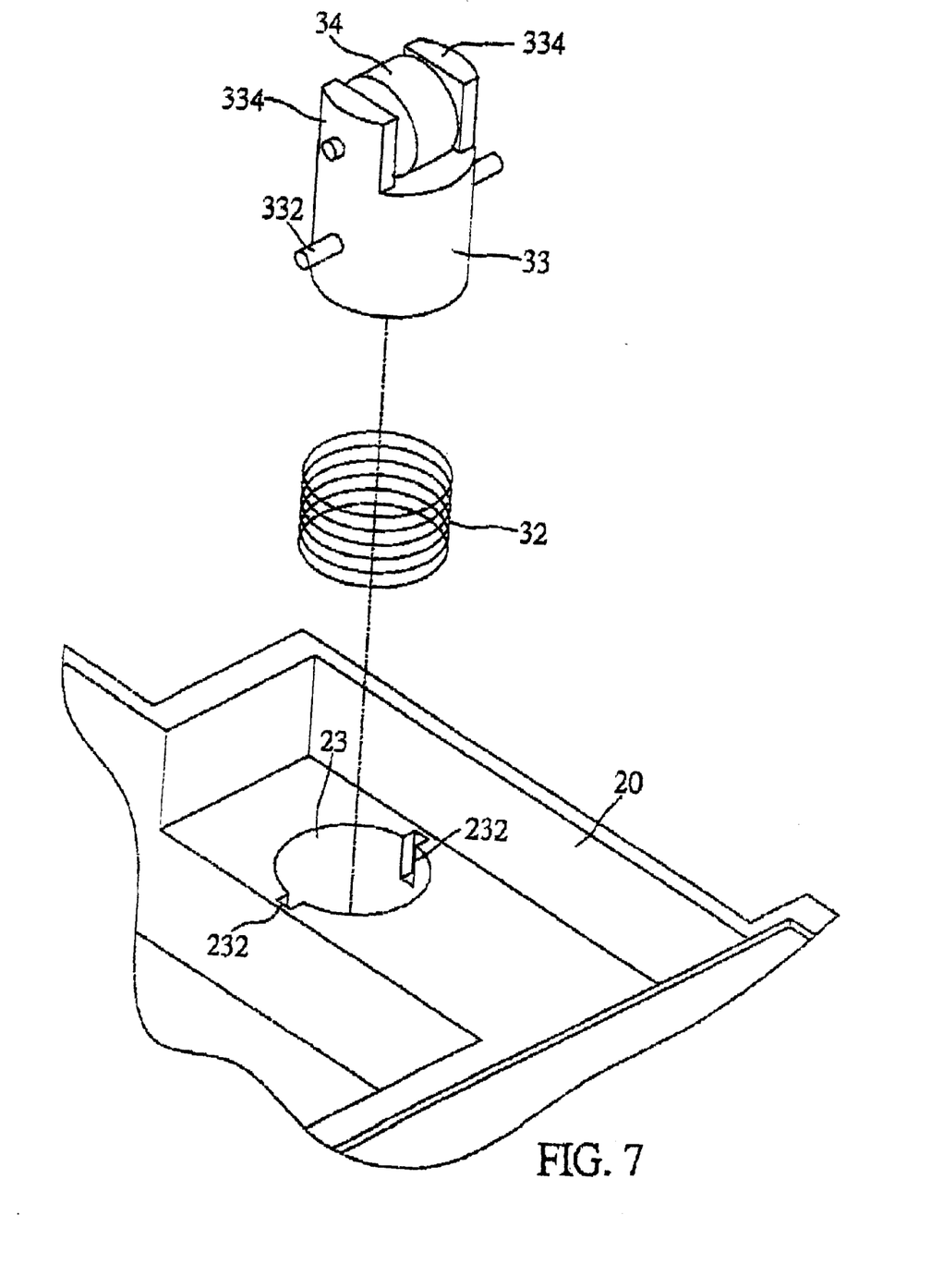
FIG. 7 is an exploded view of the vibration inhibiting mechanism of a further embodiment of the present invention.
Figure 8:
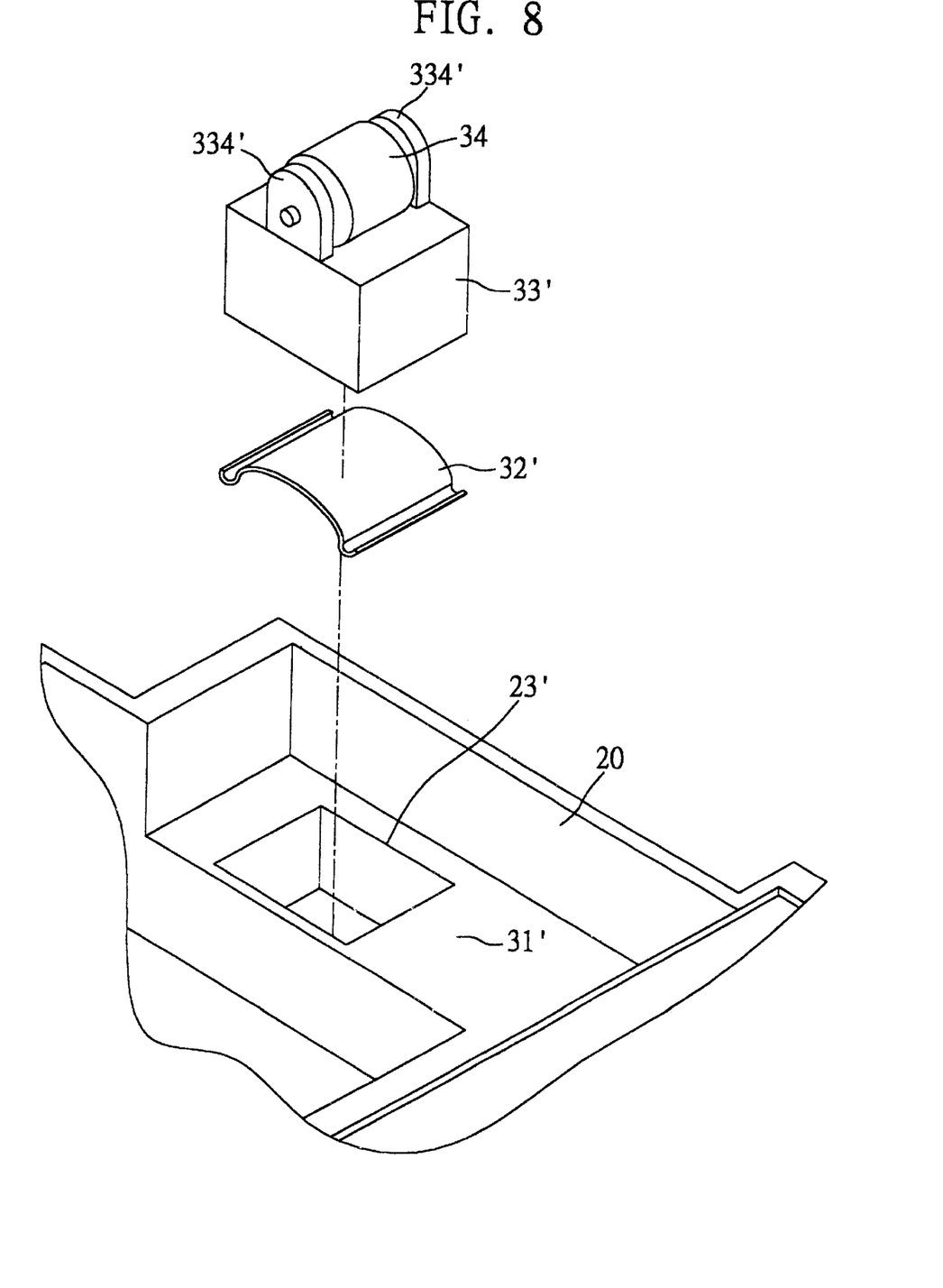
FIG. 8 is an exploded view of the vibration inhibiting mechanism of yet another embodiment of the present invention.

The cylindrical base 31 or rectangular base 31' described in FIGS. 5 and 6 can either be integrally formed with the chassis 20 or be made as a separate component for mounting on the chassis 20. Likewise, as illustrated in FIG. 7 or 8, the round recess 23 or rectangular recess 23' can be either integrally or separately formed. As shown in FIG. 7, on the recess wall of the round recess 23 a groove 232 is formed that serves the same function as the aforementioned grooves 312.

Therefore, compared with the prior art, the vibration inhibiting mechanism 30 of the present invention can provide the chassis with buffer effect by means of the resilient member to thereby reduce vibration of the chassis 20 when the chassis 20 is driven to move. As a result, the scanning quality can be improved. Meanwhile, the vibration inhibiting mechanism of the invention can be made by a lower cost than the prior art. Since the vibration inhibiting mechanism provides both limitation on movement of and reduction of vibration to the chassis, the chassis in the scanner can be free from damage or dislocation when subjected to a drop test and during handling process without the need of a locking unit as in the case of the prior art.

The invention has been described using exemplary preferred embodiment. However, it is to be understood that the scope of the invention is not limited to the disclosed embodiments. On the contrary it is intended to cover various modifications and similar arrangements. The scope of the claims, therefore, should be accorded the broadest interpretation so as to encompass all such modifications and similar arrangements.

What is claimed is:

1. An image scanner, comprising:
   a casing having a glass panel on which to receive a document to be scanned;
   a chassis moving within the casing and across the glass panel thereof;
   an image detecting device coupled to said chassis and movable therewith to scan the document received by the glass panel of said casing; and
   a vibration inhibiting mechanism to reduce vibrations as the chassis moves within the casing and across the glass panel thereof, said vibration inhibiting mechanism including:
   a base coupled to said chassis and moving therewith across the glass panel of said casing;
   a roller support coupled to said base and adapted to move reciprocally within said base towards and away from the glass panel of said casing;
   a roller mounted on the roller support and movable therewith to abut against and roll over the glass panel; and
   a resilient member carried by said base for urging the roller support towards the glass panel to bias said roller to abut against the glass panel.

2. The scanner recited in claim 1, wherein said resilient member is a coiled spring.

3. The scanner recited in claim 1, wherein said resilient member is a spring plate.

4. The scanner recited in claim 1, wherein the base of said vibration inhibiting mechanism has a cylindrical body with a pair of axially arranged grooves formed on the top thereof, said roller support having a cylindrical body that is sized for receipt within the cylindrical body of said base, the cylindrical body of said roller support also a pair of protrusions projecting laterally outward therefrom and sized for receipt by said pair of grooves formed in the cylindrical body of said base to prevent said roller support from rotating relative to said base.

5. The scanner recited in claim 4, wherein the resilient member of said vibration mechanism is housed within the cylindrical body of said base to urge said roller support coupled to said base towards the glass panel of the casing.

6. The scanner recited in claim 1, wherein the base of said vibration inhibiting mechanism has a rectangular body, said roller support also having a rectangular body that is sized for receipt within the rectangular body of said base.

7. The scanner recited in claim 6, wherein the resilient member of said vibration mechanism is housed within the rectangular body of said base to urge said roller support coupled to said base towards the glass panel of the casing.

8. The scanner recited in claim 1, wherein the chassis has a recess formed therein, the base of said vibration inhibiting mechanism coupled to said chassis within said recess thereof.

* * * * *